United States Patent [19]

Halliday et al.

[11] Patent Number: 5,605,879
[45] Date of Patent: Feb. 25, 1997

[54] OLEFIN ISOMERS AS LUBRICANTS, RATE OF PENETRATION ENHANCERS, AND SPOTTING FLUID ADDITIVES FOR WATER-BASED DRILLING FLUIDS

[75] Inventors: William S. Halliday, Cypress; David Schwertner, The Woodlands, both of Tex.

[73] Assignee: Baker Hughes Incorporated, Houston, Tex.

[21] Appl. No.: 423,150

[22] Filed: Apr. 17, 1995

[51] Int. Cl.$^6$ ............................. C09K 7/02; C09K 7/06; E21B 31/03
[52] U.S. Cl. ............................. 507/103; 508/110
[58] Field of Search ............................. 252/8.51, 8.551, 252/8.511; 507/103; 585/3, 18

[56] References Cited

U.S. PATENT DOCUMENTS

| | | | |
|---|---|---|---|
| H1,000 | 12/1991 | Patel et al. | 507/103 |
| 4,876,017 | 10/1989 | Trahan et al. | 252/8.51 |
| 5,045,219 | 9/1991 | Trahan et al. | 252/8.51 |

FOREIGN PATENT DOCUMENTS

| | | |
|---|---|---|
| 0325466A3 | 7/1989 | European Pat. Off. . |
| 0449257A3 | 10/1991 | European Pat. Off. . |
| 2166782 | 5/1986 | United Kingdom . |
| WO94/16030 | 7/1994 | WIPO . |
| WO95/21225 | 8/1995 | WIPO . |

OTHER PUBLICATIONS

Kirk–Othmer Encyclopedia of Chemical Technology, 3rd Edition, pp. 487–492 (1981).

Superior Performance with Minimal Environment Impact: A Novel Non–Aqueous Drilling Fluid, SPE–25753, p. 714 (1990).

*Primary Examiner*—David B. Springer
*Attorney, Agent, or Firm*—Paula D. Morris

[57] ABSTRACT

The present invention provides non-toxic, biodegradable olefin isomers which may be used as lubricants, rate of penetration enhancers, and/or spotting fluids for water-based drilling muds. When used as a spotting fluid additive, the olefin isomers preferably are supplemented with functional additives, namely emulsifiers, viscosifiers, surfactants, and/or brine. When used as lubricants and/or rate of penetration enhancers, the olefin isomers preferably are used alone or in combination with surfactants.

26 Claims, No Drawings

OLEFIN ISOMERS AS LUBRICANTS, RATE OF PENETRATION ENHANCERS, AND SPOTTING FLUID ADDITIVES FOR WATER-BASED DRILLING FLUIDS

FIELD OF THE INVENTION

The present invention relates to olefin isomers which may be added to water-based drilling muds which act as: (a) downhole lubricants; (b) rate of penetration (ROP) enhancers; and/or, (c) spotting fluids. The additives perform the following functions, respectively: (a) prevent a drill bit from sticking in a formation; (b) enhance the penetration of a drill bit through a formation; or, (c) free a drill bit when it becomes lodged in a formation during drilling.

BACKGROUND OF THE INVENTION

During the drilling of oil and/or gas wells, a drill bit at the end of a rotating drill string, or at the end of a drill motor, is used to penetrate through geologic formations. During this operation, drilling mud is circulated through the drill string, out of the bit, and returned to the surface via the annular space between the drill pipe and the formation. Drilling mud serves numerous functions, including: cooling and lubricating the drill string and drill bit; counterbalancing the pressures encountered in the formation using hydrostatic pressure; providing a washing action to remove the formation cuttings from the wellbore; and, forming a friction reducing wall cake between the drill string and the wellbore.

During drilling, the drill string may develop unacceptable rotational torque or, in the worst case, become stuck. When this happens, the drill string cannot be raised, lowered, or rotated. Common factors leading to this situation include: (1) cuttings or slough buildup in the borehole; (2) an undergauge borehole; (3) irregular borehole development embedding a section of the drill pipe into the drilling mud wall cake; and, (4) unexpected differential formation pressure.

Differential pressure sticking occurs when the drill pipe becomes imbedded in the wall mud cake opposite a permeable zone. The difference between (a) the hydrostatic pressure in the drill pipe, and (b) the formation pressure holds the pipe in place, resulting in sticking pipe.

Differential sticking may be prevented, and a stuck drill bit may be freed, using an oil/mud or an oil or water based surfactant composition. Such a composition reduces friction, permeates drilling mud wall cake, destroys binding wall cake, and reduces differential pressure. Unfortunately, many of such compositions are toxic to marine life.

Synthetic polyalphaolefins are non-toxic and effective in marine environments when used as lubricants, ROP enhancers, and/or spotting fluid additives for water-based drilling muds. A continuing need exists for other non-toxic additives for water-based drilling muds which serve as lubricants, ROP enhancers, and/or spotting fluids.

SUMMARY OF THE INVENTION

The present invention provides non-toxic, biodegradable olefin isomers which may be used as lubricants, rate of penetration enhancers, and/or spotting fluids for water-based drilling muds. When used as a spotting fluid additive, the olefin isomers preferably are supplemented with functional additives, namely emulsifiers, viscosifiers, surfactants, and/or brine. When used as lubricants and/or rate of penetration enhancers, the olefin isomers preferably are used alone or in combination with surfactants.

DETAILED DESCRIPTION OF THE INVENTION

When introduced at a certain volume downhole, the additives of the present invention act as lubricating agents and/or rate of penetration enhancers, preventing drag and torque on an operating drill pipe. When introduced at a greater volume downhole, the additives act as spotting fluids, which dislodge stuck drill pipe from the well bore.

As used herein, the term "olefin isomers" shall be defined as compounds having the following general formula:

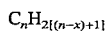

$$C_nH_{2[(n-x)+1]}$$

wherein n is between about 8–30; x is the number of carbon-carbon double bonds in the isomer; and, x is between about 1–n/2. In a preferred embodiment, the double bonds in the olefin isomers are located internally within the carbon backbone. As used herein, the phrase "internally within the carbon backbone" shall refer to a location other than at a terminal end of the carbon backbone.

The following general formula is believed to represent preferred olefin isomers of the present invention:

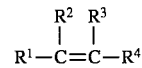

$$R^1-\underset{\underset{R^2}{|}}{C}=\underset{\underset{R^3}{|}}{C}-R^4$$

wherein $R^1$ and $R^4$ independently are selected from the group consisting of straight chain alkyl groups with between about 1–28 carbon atoms, and branched alkyl groups with between about 1–28 carbon atoms, said branched alkyl groups further comprising between about 0–2 substituents selected from the group consisting of alkyl groups with between about 1–5 carbon atoms; and, $R^2$ and $R^3$ independently are selected from the group consisting of hydrogen and alkyl groups with between about 1–5 carbon atoms, provided that the total number of carbon atoms in said olefin isomers is between about 8–30.

In a preferred embodiment, the olefin isomers comprise a mixture of molecules having primarily 16 and 18 carbon atoms, along with a smaller quantity of molecules having 14 carbon atoms. Preferred olefin isomers have a minor amount of unsaturation located internally within the carbon backbone, and have between 0–2 substituents selected from the group consisting of alkyl groups having between about 1–2 carbon atoms. Preferred olefin isomers meet the applicable EPA toxicity requirements for discharge into U.S. waters.

Whether used as a lubricant, an ROP enhancer, or a spotting fluid, the olefin isomers may be supplemented with functional additives, such as emulsifiers, viscosifiers, surfactants, and/or brine. A spotting fluid blend preferably includes each of these functional additives. A lubricant or ROP enhancer preferably contains no functional additives, but may include surfactants. A combination of olefin isomers and any functional additives hereinafter will be called an "olefin isomer blend."

The olefin isomers of the present invention may be formed by polymerizing ethylene-which generally is derived from the catalytic cracking of naptha-using known procedures. Suitable procedures that may be adapted by persons of skill in the art to form the olefin isomers of the present invention are described in UK Patent Application GB 2 166 782A, incorporated herein by reference; and, *Kirk-Othmer Encyclopedia of Chemical Technology* (3d Ed. 1981), pp.

487–491, incorporated herein by reference. See also U.S. Pat. Nos. 3,482,000; 3,391,291; 3,689,584; 3,663,647; 3,676,523; and, *Hydrocarbon Process*, 58(11) 128 (1979), referred to in the cited *Kirk-Othmer* text, and incorporated herein by reference.

Olefin isomers containing between about 8–30 carbon atoms generally should function in the present invention; however, isomers having fewer than 14 carbon atoms are more toxic, and isomers having more than 18 carbon atoms are more viscous. Therefore, olefin isomers having between 14–18 carbon atoms are preferred, and isomer blends comprising primarily 16- and 18-carbon atoms, with a small amount of dimers thereof and olefin isomers containing 14-carbon atoms, are most preferred.

Preferred commercially available olefin isomers for use in the present invention are C16/C18 Isomerized Olefins, which may be obtained from Chevron Chemical Co. The Chevron C16/C18 Isomerized Olefins generally have the following properties:

| Carbon Number analysis | | | |
|---|---|---|---|
| C16 Olefins | | | 47% |
| C18 Olefins | | | 47% |
| C16 or C18 Dimers | | | 5% |
| C14 and C20 Olefins | | | ~1% |
| Density at 60° F. | | | 0.70 |
| Viscosity | @ | 40° C. | 3.43 cSt |
| | @ | 100° C. | 1.40 cSt |
| Absorbance/mm @ 1378 cm–1 | | | 10.4 |
| Color | | | Clear and Bright |
| Cloud Point | | | <15° F. |

Another suitable commercially available olefin isomer is C1618IO, available from Albemarle Corporation. C1618IO has the following properties:

| Carbon #, wt % | |
|---|---|
| C14 | 0.7 |
| C16 | 54.3 |
| C18 | 36.5 |
| C20 | 8.2 |
| C22 | 0.3 |
| Olefin Isomers, mole % (NMR) | |
| Linear terminal | 1.7 |
| Linear internal | 70.2 |
| Branched terminal | 18.8 |
| Trisubstituted | 9.2 |

A preferred additive for use as a lubricant and/or rate of penetration enhancer (lubricant/ROP enhancer) comprises 100% C16/C18 olefin isomers, such as C16/C18 Isomerized Olefins, available from Chevron Chemical Co. Preferred lubricant/ROP enhancers also comprise olefin isomer blends containing between about 90–100% by volume of primarily C16/C18 olefin isomers and between about 1–10% by volume surfactants. A preferred lubricant and/or rate of penetration enhancer, which currently comprises 100% C16/C18 olefin isomers, is DFE 619, available from Baker Hughes INTEQ. The lubricant/ROP enhancer may be added to the mud pit to result in a final concentration of lubricant/ROP enhancer in the water based drilling mud of between about 1–15% by volume, preferably between about 1–2% by volume.

Generally, a spotting fluid is pumped downhole in greater quantities than a lubricant, and is used to dislodge a previously lodged bit. A preferred spotting fluid is BLACK MAGIC CLEAN, available from Baker Hughes INTEQ, which contains 50–80% by volume of C16/C18 Isomerized Olefins, obtained from Chevron Chemical Co., and 20–50% by volume BLACK MAGIC SACKED FISHING TOOL (SFT), available from Baker Hughes INTEQ. BLACK MAGIC SFT comprises a dry mixture of optimum-size air-blown asphalt, lime, fatty acids, and dispersants available in powdered form.

A second preferred embodiment, which contains no asphalt, is DFE-1310, available from Baker Hughes INTEQ. DFE-1310 has the following composition:

| MATERIAL | CC | G | BBL |
|---|---|---|---|
| ISO-TEQ | 287.0 | 226.7 | 0.82 |
| CARBO-GEL | | 6 | |
| Lime | | 10 | |
| TEQMUL | 8.8 | 8.0 | |
| DFE-416 | 23.6 | 38.7 | 0.10 |
| NaCl Brine (20%) | 33.6 | 38.7 | 0.10 |
| REV DUST | | 10 | |
| DFE-417 | | 5 | |

From the foregoing formula, the following materials are available from Baker Hughes INTEQ: ISO-TEQ (isomerized olefins); CARBO-GEL (an organophilic clay); TEQMUL (a Polyamide Emulsifier); DFE-416 (a fatty acid emulsifier); and, DFE-417 (a viscosifier). REV-DUST is a simulated drilled solid, available from Mil-White, Inc., Houston, Tex.;

DFE-1310 has the following properties:

| PROPERTY | INITIAL |
|---|---|
| Temperature (°F./°C.) | 120/48.9 |
| 600 rpm | 50 |
| 300 rpm | 33 |
| 200 rpm | 26 |
| 100 rpm | 18 |
| 6 rpm | 8 |
| 3 rpm | 7 |
| Plastic Viscosity (cPs) | 17 |
| Yield Point | 7.81 g/m$^2$ |
| | (16 lb/100 ft$^2$) |
| Gels | 3760 g/m$^2$ |
| | (10/13 lb/ft$^2$) |
| Weight | 91.1 g/m$^2$ |
| | (7.6 ppg) |
| Synthetic Water Ratio | 90/10 |

In a preferred embodiment, the olefin isomer blend for use as a spotting fluid has a concentration of between about 50–95% by volume olefin isomer and between about 5–50% by volume functional additives. More specifically, a preferred embodiment contains between about 50–95% by volume olefin isomer; between about 2–6% by volume emulsifier; between about 0.2–5% by volume viscosifier; between about 2–5% by volume surfactant; and, between about 1–40% by volume brine. As a spotting fluid, the additive blend may be introduced into the mud pit, to result in a total concentration in the drilling mud of between about 1–15% by volume, more preferably between about 3–15% by volume, most preferably between about 3–5% by volume. The use of the drilling mud need not be interrupted when the olefin isomer is added.

The invention will be better understood with reference to the following examples:

EXAMPLE 1

A major oil and gas producer working in the High Island Area Offshore Texas became concerned about low rate of penetration when drilling in a 14.92 cm (5⅞ inch) hole. The concern was magnified because a 304.8 m (1,000 ft) coring operation was scheduled.

A protective liner was set at 4156.86 m (13,638 ft) in the 28° wellbore. The mud system was a low pH DRILL THIN system, sold by Baker Hughes INTEQ, designed to prevent shale dispersion. The drilling fluid contained 9.33 kg/bbl (25 lb/bbl) of MIL-CARB, a sized calcium carbonate obtained from Baker Hughes INTEQ, to provide low spurt loss. The plan was to core +/−182.88 m (600 ft) of shale, and +/−121.92 m (400 ft) of sand in a 1.99 g/cm³ (16.6 ppg) pore pressure environment.

After drilling out and testing the shoe, a PDC bit was picked up. The bit was dressed with 3–14/32 jets while pumping 946.35 liters/min (250 gal/min) giving a hydraulic horsepower of 6.35/cm² and 2.5/in². Drilling rates averaged 1.52–2.44 m/hr (5–8 ft/hr). DFE 619 was added to the suction pit to result in a 2% concentration. The rate of penetration increased immediately to 3.05–7.62 m/hr (10–25 ft/hr). The hole was drilled down to the core point.

Over the next two days and two coring runs, the rate of penetration was increased to 3.35 m/hr (11 ft/hr). One problem was that the DFE 619 had a tendency to "float" on top of the 1.99 g/cm³ (16.6 ppg) mud. The sweeps allowed the DFE 619 to mix better than when added to the suction pit. Efforts were made to inject the DFE 619 directly into the low pressure side of the mud pump, but this caused problems with pressure losses, either from the diaphragm pump being used or from the density difference between the weight of the mud and the DFE 619.

In summary, the rate of penetration was doubled on a consistent basis while using DFE 619. The DFE 619 is emulsified quickly in a 1.95 g/cm³ (16.3 ppg) drilling fluid. This fluid contained 9.35 g/cm³ (78 lb/bbl) of Ligco and 50.07 kg/bbl (6 lb/bbl) of DRILL THIN.

EXAMPLE 2

The NEW DRILL system was used to drill this section. Casing was tested to 1.77 g/cm³ (14.8 ppg) equivalent mud weight (EMW) and mud weight was raised from 1.25 g/cm³ (10.4 ppg) to 22.4 g/cm³ (11.2 ppg) while drilling cement. While reaming the old hole section below the 2.22 cm (⅝ in) casing, the pipe became stuck at 3097.38 m (10162 ft). BLACK MAGIC CLEAN (40 bbls) was spotted into the drilling mud, and the pipe came free. The bottom hole assembly was changed and reaming was resumed to the bottom of the hole at 3147.67 m (10,327 ft). A short trip was made with no problems.

The foregoing demonstrates that BLACK MAGIC CLEAN is an effective spotting additive for water-based drilling muds.

EXAMPLE 3

A major independent oil and gas producer working in the Matagorda Island Area Offshore Texas became differentially stuck while conditioning the well bore following a period of remedial work to cure loss of circulation. BLACK MAGIC SACKED FISHING TOOL, obtained from Baker Hughes INTEQ, was mixed on location with Baker Hughes INTEQ's Synthetic Based Fluid, ISO-TEQ®, and spotted freeing the stuck pipe in 36 hours.

Prior to the pipe becoming stuck, a very permeable (2 darcy) sand was being drilled. Testing indicated that, with the proper product mix and correct concentration, this depleted sand (0.827 g/cm³, 6.9 ppg differential) could be successfully drilled without differential sticking. The sand was drilled down to the lower bedding plane where there was a complete loss of returns along the sand/shale interface. A strong possibility exists that a fracture was caused along this plane due to shrinkage.

After pumping two conventional lost circulation material pills (LCM pills), obtained from Baker Hughes INTEQ, a series of gunk squeezes (prepared with ISOTEQ) were pumped before the wellbore would stay full and the mud density could be decreased to 1.86 g/cm³ (15.5 ppg) from 2.12 g/cm³ (17.7 ppg). The mud was then conditioned with LCM before attempting to wash to bottom. While washing to bottom, the drillstring became stuck at 3954.48 meters (12,974 ft).

While working the pipe using torque and jarring down and up on the stuck pipe, ISO-TEQ and SFT were mixed in the slugging pit. The final spotting fluid consisted of 0.60 bbls ISO-TEQ, 47.0 ppb SFT, and 495 ppb MILBAR. The following rheological properties were recorded prior to pumping.

Density: 1.86 g/cm³ (15.5 ppg)
Plastic Viscosity: 45 cps @48.9° C. (120° F.)
Yield Point: 22 lb/100 ft² or 10.74 g/m²
Gels: 7/15–10 sec/10 min Twenty three barrels of ISO-TEQ/SFT were pumped. Five barrels were spotted outside of the pipe leaving the remainder in the drillstring to move the spot. While continually jarring on the pipe with the drilling jars, 0.5 barrels of spot was moved every thirty minutes. Once a wireline unit arrived, a free-point was determined and pipe was backed off to pick up the fishing jars.

Back on the bottom, the fishing assembly was screwed into the fish. The pipe came free after being jarred on four times—three times down, once up. The fish was back reamed 7.62 m (25 ft) back up into the liner. An accumulative period of thirty-six hours passed from the time the pipe became stuck until ISO-TEQ/SFT was spotted and the pipe freed.

The foregoing demonstrates that the mixture of ISOTEQ/SFT is an effective spotting additive.

EXAMPLE 4

An operator working offshore Texas in the Matagorda Island area became differentially stuck while running a drilling liner through depleted sands. A spotting fluid was mixed at the rigsite using BLACK MAGIC SACKED FISHING TOOL (SFT) and ISO-TEQ, both obtained from Baker Hughes INTEQ. The pipe came free 6½ hours after spotting.

The well was drilled through two very permeable (2 and 5 darcy) sand sections separated by 27.43 m (90 ft) of shale. these depleted sands totaled approximately 131.06 meters (430 feet) in length. Using 1.86 g/cm³ (15.5 ppg) mud weight, the pressure differential across the sands was 224.98 kg/cm² (3,200 psi). To seal the sands, the mud system used was a UNICAL System with 0.3 ppb MIL-TEMP, obtained from Baker Hughes INTEQ. Selected Seepage Control Materials (SCM) were used: MIL-CARB, obtained from Baker Hughes INTEQ; CHEK-LOSS, obtained from Baker Hughes INTEQ; and GILSONITE, obtained from Baker Hughes INTEQ. This section drilled with no problems using judicious drilling practices and optimized drilling fluids.

The 19.69 cm (7¾ in) lines were being run into the open hole (21.59 cm, 8½ in) when it became stuck 60.96 m (200 ft) below the last liner shoe (which put it through the first sand, shale section and into the top of the second sand). The filter cake development (provided by high permeability and differential pressure), combined with the tight tolerance (7¾ in casing inside of 8½ in hole), meant potentially considerable contact area.

Because of the potential for stuck pipe while drilling and running casing, the slug pit was kept clean throughout this interval. ISO-TEQ was stored in one of the rig's tanks and sufficient BLACK MAGIC SACKED FISHING TOOL (SFT) was kept on board.

The decision was made to mix and spot 50 barrels of ISO-TEQ SFT. With the slugging pit already clean, it was only necessary to flush the mixing lines before adding the ISO-TEQ fluid into the pit. Then the BLACK MAGIC SFT was added and allowed to shear until smooth (10 minutes). The spot was then weighted to 1.87 g/cm³ (15.6 ppg) using barite. The material quantities and mud properties were:

| Product | Material Quantities | |
|---|---|---|
| | Quantity Used | Per Barrel |
| ISO-TEQ | 30 barrels | 0.6 bbls |
| Water* | 1 barrel | 0.02 bbls |
| BLACK MAGIC SFT | 47 sacks | 23.45 kg (51.7 lb) |
| MILBAR | 222 sacks | 201.39 kg (444 lb) |
| Mud Properties | | |
| Density: | 1.87 g/cm³ (15.6 ppg) | |
| Plastic Viscosity: | 39 cps @ 48.9° C. (120° F.) | |
| Yield Point: | 17 lb/100 ft² | |
| | 830.01 g/m² | |
| Gel Strength: | 6/13 lb/100 ft² | |
| | 22.53 g/m² | |

*The water was incorporated from what was left in the mixing line after flushing.

After mixing, the ISO-TEQ/SFT was spotted putting 15 barrels outside the pipe. The spot soaked 2 hours, then 1 barrel was pumped every hour with the pipe being worked. After 6½ hours, the pipe came free and drag out of the hole was normal. On the following wiper trip, the hole was circulated out and the spot was incorporated into the mud system with no ill effects; a subsequent reduction in the high temperature/high pressure fluid loss was noted.

The foregoing demonstrates that the ISO-TEQ/SFT mixture is an effective spotting agent.

EXAMPLE 5

While drilling in Grand Isle Block #25 State Lease (TX) #12746, stuck pipe occurred. A BLACK MAGIC CLEAN pill was used to free the pipe. The well was being drilled through depleted sands at 3869.91 meters (12,690 ft) measured depth and had ±80,000# drag on the drill string pick up weight. Lubricants were being added and maintained through the mud system, but the pipe became stuck while tripping for a new bit. BLACK MAGIC CLEAN was spotted over the open hole section and the pipe became free in approximately 1 hour. The jars were not functioning at this time, and the angle in this section of the hole had been dripped from 19.2° to 7.7°. After tripping out of the hole, a hole opener and string reamer were run to total depth with slight sticking problems. The BLACK MAGIC pill in the hole was incorporated into the mud system with no negative effects to fluid rheology or other properties. Drill cuttings and fluids overboard showed no sign of sheening or slick.

Persons of skill in the art will appreciate that many modifications may be made to the embodiments described herein without departing from the spirit of the present invention. Accordingly, the embodiments described herein are illustrative only and are not intended to limit the scope of the present invention.

We claim:

1. A drilling fluid additive for water-based drilling muds comprising olefin isomers comprising between about 8–30 carbon atoms, said olefin isomers comprising a carbon backbone comprising at least one double bond located internally within said carbon backbone.

2. The additive of claim 1 wherein a majority of said olefin isomers are selected from the group consisting of olefin isomers comprising 16- and 18- carbon atoms.

3. The additive of claim 1 wherein said olefin isomers comprise molecules having the following general structure:

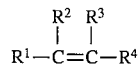

wherein $R^1$ and $R^4$ independently are selected from the group consisting of straight chain alkyl groups comprising between about 1–28 carbon atoms, and branched alkyl groups comprising between about 1–28 carbon atoms, said branched alkyl groups further comprising between about 0–2 substituents selected from the group consisting of alkyl groups comprising between about 1–5 carbon atoms; and, $R^2$ and $R^3$ independently are selected from the group consisting of hydrogen and alkyl groups comprising between about 1–5 carbon atoms, provided that the total number of carbon atoms in said olefin isomers is between about 8–30.

4. The additive of claim 3 wherein said olefin isomers comprise a mixture of molecules wherein:

a majority of said molecules are selected from the group consisting of olefin isomers comprising 16- and 18carbon atoms; and, said molecules further comprise between about 0–2 substituents selected from the group consisting of alkyl groups comprising between about 1–2 carbon atoms.

5. The drilling fluid additive of claim 1 wherein:

said additive comprises a spotting fluid; said spotting fluid comprises between about 50–95% by volume of said olefin isomers; and, said spotting fluid comprises between about 2–6% by volume emulsifier, between about 0.2–5% by volume viscosifier, between about 2–5% by volume surfactant, and between about 1–40% by volume brine.

6. The drilling fluid additive of claim 2 wherein: said additive comprises a spotting fluid:

said spotting fluid comprises between about 50–95% by volume of said olefin isomers; and, said spotting fluid further comprises between about 2–6% by volume emulsifier, between about 0.2–5% by volume viscosifier, between about 2–5% by volume surfactant, and between about 1–40% by volume brine.

7. The drilling fluid additive of claim 3 wherein: said additive comprises a spotting fluid:

said spotting fluid comprises between about 50–95% by volume of said additive; and, said spotting fluid further comprises between about 2–6% by volume emulsifier, between about 0.2–5% by volume viscosifier, between about 2–5% by volume surfactant, and between about 1–40% by volume brine.

8. The drilling fluid additive of claim 4 wherein: said additive comprises a spotting fluid;

said spotting fluid comprises between about 50–95% by volume of said olefin isomers; and, said spotting fluid further comprises between about 2–6% by volume emulsifier, between about 0.2–5% by volume viscosifier, between about 2–5% by volume surfactant, and between about 1–40% by volume brine.

9. The drilling fluid additive of claim 1 wherein:

said additive is selected from the group consisting of a lubricant and a rate of penetration enhancer;

said additive comprises between about 90–100% by volume of said olefin isomers; and, said additive further comprises between about 0–10% by volume surfactant.

10. The drilling fluid additive of claim 2 wherein:

said additive is selected from the group consisting of a lubricant and a rate of penetration enhancer;

said additive comprises between about 90–100% by volume of said olefin isomers; and, said additive further comprises between about 0–10% by volume surfactant.

11. The drilling fluid additive of claim 3 wherein:

said additive is selected from the group consisting of a lubricant and a rate of penetration enhancer;

said additive comprises between about 90–100% by volume of said olefin isomers; and, said additive further comprises between about 0–10% by volume surfactant.

12. The drilling fluid additive of claim 4 wherein:

said additive is selected from the group consisting of a lubricant and a rate of penetration enhancer;

said additive comprises between about 90–100% by volume of said olefin isomers; and, said additive further comprises between about 0–10% by volume surfactant.

13. A water-based drilling mud comprising between about 2–15% by volume of a drilling fluid additive comprising between about 8–30 carbon atoms, said olefin isomers comprising a carbon backbone comprising at least one double bond located internally within said carbon backbone.

14. The drilling mud of claim 13 a majority of said olefin isomers are selected from the group consisting of olefin isomers comprising 16- and 18- carbon atoms.

15. The drilling mud of claim 13 wherein said olefin isomers comprise molecules having the following general structure:

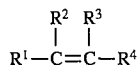

wherein $R^1$ and $R^4$ independently are selected from the group consisting of straight chain alkyl groups comprising between about 1–28 carbon atoms, and branched alkyl groups comprising between about 1–28 carbon atoms, said branched alkyl groups further comprising between about 0–2 substituents selected from the group consisting of alkyl groups comprising between about 1–5 carbon atoms; and, $R^2$ and $R^3$ independently are selected from the group consisting of hydrogen and alkyl groups comprising between about 1–5 carbon atoms, provided that the total number of carbon atoms in said olefin isomers is between about 8–30.

16. The drilling mud of claim 13 wherein said olefin isomers comprise a mixture of molecules wherein:

a majority of said molecules are selected from the group consisting of olefin isomers comprising 16- and 18-carbon atoms; and, said molecules further comprise between about 0–2 substituents selected from the group consisting of alkyl groups comprising between about 1–2 carbon atoms.

17. The drilling mud of claim 13 wherein:

said drilling fluid additive comprises a spotting fluid; said spotting fluid comprises between about 50–95% by volume of said olefin isomers; and, said spotting fluid further comprises between about 2–6% by volume emulsifier, between about 0.2–5% by volume viscosifier, between about 2–5% by volume surfactant, and between about 1–40% by volume brine.

18. The drilling mud of claim 13 wherein:

said drilling fluid additive is selected from the group consisting of a lubricant and a rate of penetration enhancer;

said additive comprises between about 90–100% by volume of said olefin isomers; and, said additive further comprises between about 0–10% by volume surfactant.

19. The drilling mud of claim 14 wherein: said drilling fluid additive comprises a spotting fluid:

said spotting fluid comprises between about 50–95% by volume of said olefin isomers; and, said spotting fluid further comprises between about 2–6% by volume emulsifier, between about 0.2–5% by volume viscosifier, between about 2–5% by volume surfactant, and between about 1–40% by volume brine.

20. The drilling mud of claim 14 wherein:

said additive is selected from the group consisting of a lubricant and a rate of penetration enhancer;

said additive comprises between about 90–100% by volume of said olefin isomers; and, said additive further comprises between about 0–10% by volume surfactant.

21. The drilling mud of claim 15 wherein:

said drilling fluid additive comprises a spotting fluid:

said spotting fluid comprises between about 50–95% by volume of said additive; and, said spotting fluid further comprises between about 2–6% by volume emulsifier, between about 0.2–5% by volume viscosifier, between about 2–5% by volume surfactant, and between about 1–40% by volume brine.

22. The drilling mud of claim 15 wherein:

said additive is selected from the group consisting of a lubricant and a rate of penetration enhancer;

said additive comprises between about 90–100% by volume of said olefin isomers; and, said additive further comprises between about 0–10% by volume surfactant.

23. A process comprising the step of adding to a water-based drilling mud between about 1–15% by volume of a drilling fluid additive comprising olefin isomers comprising between about 8–30 carbon atoms, said olefin isomers comprising a carbon backbone comprising at least one double bond located internally within said carbon backbone.

24. The process of claim 23 wherein a majority of said olefin isomers are selected from the group consisting of olefin isomers comprising 16- and 18- carbon atoms.

25. The process of claim 23 wherein said olefin isomers comprise molecules having the following general structure:

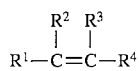

wherein $R^1$ and $R^4$ independently are selected from the group consisting of straight chain alkyl groups comprising between about 1–28 carbon atoms, and branched alkyl groups comprising between about 1–28 carbon atoms, said branched alkyl groups further comprising between about 0–2 substituents selected from the group consisting of alkyl groups comprising between about 1–5 carbon atoms; and, $R^2$ and $R^3$ independently are selected from the group consisting of hydrogen and alkyl groups comprising between about 1–5 carbon atoms, provided that the total number of carbon atoms in said olefin isomers is between about 8–30.

26. The process of claim 23 wherein said olefin isomers comprise a mixture of molecules wherein:

a majority of said molecules are selected from the group consisting of olefin isomers comprising 16- and 18-carbon atoms; and, said molecules further comprise between about 0–2 substituents selected from the group consisting of alkyl groups comprising between about 1–2 carbon atoms.

* * * * *